(12) United States Patent
Williams (10) Patent No.: US 8,794,650 B2
(45) Date of Patent: Aug. 5, 2014

(54) HANDS FREE BICYCLE MAINTENANCE PEDALER

(71) Applicant: Jefferson S Williams, Westminster, CO (US)

(72) Inventor: Jefferson S Williams, Westminster, CO (US)

(*) Notice: Subject to any disclaimer, the term of this patent is extended or adjusted under 35 U.S.C. 154(b) by 0 days.

(21) Appl. No.: 13/872,219

(22) Filed: Apr. 29, 2013

(65) Prior Publication Data

US 2014/0041180 A1 Feb. 13, 2014

Related U.S. Application Data

(63) Continuation-in-part of application No. 13/570,552, filed on Aug. 9, 2012.

(51) Int. Cl.
*B25H 1/00* (2006.01)
*F16M 11/20* (2006.01)

(52) U.S. Cl.
CPC ............. *F16M 11/20* (2013.01); *B25H 1/0014* (2013.01)
USPC ........................................................ 280/244

(58) Field of Classification Search
CPC .............. B25H 1/00; B25H 5/00; B62H 3/00; B62H 3/02; B62H 3/12
USPC ...................... 269/12, 55; 280/248
See application file for complete search history.

(56) References Cited

U.S. PATENT DOCUMENTS

| 646,033 A | 3/1900 | Offen |
| 5,083,069 A | 1/1992 | Jimenez |
| 5,996,814 A * | 12/1999 | Workman et al. ............... 211/22 |

FOREIGN PATENT DOCUMENTS

| EP | 1918189 A1 | 7/2008 |
| EP | 2669062 A1 * | 4/2013 |

* cited by examiner

*Primary Examiner* — Joseph M Rocca
*Assistant Examiner* — Felicia L Brittman
(74) *Attorney, Agent, or Firm* — Leyendecker & Lemire, LLC (57) ABSTRACT

One embodiment of a hands free bicycle maintenance pedaler provides means to the operator to have both hands free for adjusting, cleaning, lubricating, inspecting or locking the drive train components of a supported bicycle. One embodiment has a motor (1600) communicating with a power enclosure (1210) and a speed pedal (1205) to variably power said motor. Said motor frictionally engages with a motor plate (1500) through which an output shaft (1620) passes and frictionally engages with a crank interface arm (1700). Said crank interface arm contains a temporary connection means to a crank arm (190) using pair of connector rods (1745) along said crank arm. Said motor plate is pivotable and slidable along a carriage (1400). Said carriage is slidable along a tube (1300) or work stand (110) to achieve acceptable orientation between the device and an imaginary line through the center line of a bottom bracket of a bicycle.

20 Claims, 5 Drawing Sheets

HANDS FREE BICYCLE MAINTENANCE PEDALER

CROSS-REFERENCE TO RELATED APPLICATIONS

This application is a continuation in part (CIP) of U.S. patent application Ser. No. 13/570,552 filed on Aug. 9, 2012 having the same inventor and title as the present application. The present application claims priority to the foregoing application.

BACKGROUND

Previously the common methods available to clean, inspect, lubricate, adjust or simply observe a bicycle drive train consists of three main options; 1) install the bicycle into one of the many bicycle stands currently available or alternate stable setup, 2) turn the bike upside down on its saddle and handlebars, or 3) Lean the bicycle against something or have someone hold the bike quasi upright in the "riding position" while occasionally lifting the bike off the ground to allow the rear wheel to turn; enabling forward motion of the drive train. All 3 methods share similar drawbacks. Option 1—typically a bike stand; is the preferred and least hindered of the 3. All known bike stands provide a range of different specifications, improvements, designs, primarily developed and enhanced to support the bicycle and or to improve "portability" of the stand system itself. U.S. Pat. No. 5,996,814 to Workman and House (1999) for instance, improves stability and portability of previous designs. Regardless of stand specifics, they all share a common requirement that the user relies on a hand; either one of their own or that of a helper to turn the crank to advance or "back pedal" the crank as needed. This method is most commonly performed by grabbing the drive side pedal itself (if installed) using a hand and rotating the associated crank arm thus simulating the pedaling effect. This has several serious drawbacks. Firstly, shifter adjustments are difficult to make due to having one hand constantly required to turn the crank while the other hand usually "takes turns" between turning adjustment screws, barrels while also having to activate the appropriate shifter. Secondly, searching for sources of rattles, noises or other general issues is difficult due to a requirement to physically stay in close proximity to the crank—to keep the drive train operating. This is nearly impossible to perform successfully if a perceived noise only presents itself during high speed rotation of either the drive train itself or a rear free hub body. If for instance a noise appears in the free hub only while free turning at roughly 25 miles per hour or higher, it is not practical to attempt this speed of rotation while using a hand to turn the drive side crank. Nor is this instantly solvable by riding the bicycle if conditions do not allow. Thirdly, cleaning and lubricating the drive train—such as the chain, chain rings and cassette is a labor intensive task made very difficult due to a shortage of free hands.

One common method for maintaining a chain for instance has the user holding a rag around some portion of the chain while the other hand pedals the drive train such that the chain runs "through" the rag. Once finished, the user may apply lubricant quickly in much the same way—by holding a bottle of lube near the chain, allowing drops to fall while pausing occasionally to advance the chain manually. Per manufacturing guidelines—the user typically is instructed to wipe off excess lube to reduce the issues known to too much lubrication (accelerated wear, gumming etc. . . . ). Unfortunately due to the chain lube already being applied directly, excess lube is easily slung or dripped onto the frame and nearby components.

Fourthly and lastly, the current solution of using a dedicated hand to turn the pedals while using the second "free hand" to perform all other tasks is often filthy work. The user must be diligent (either by washing or swapping/replacing of gloves) to ensure that grease, grime, lubricant or other contaminants do not find their way onto the shifter hoods and or bar tape. Popular use of white shifter hoods and or bar tape only exacerbates the appearance issue. Not just unsightly; the lubricant and or grime can easily find its way into the riders' eyes at a later time due to frequent use of the hand or glove as a method to wipe away excess sweat. All efforts to minimize this contamination should be considered good practice. The upside down method of option 2 again relies on the mechanic to turn the pedal as needed as in option 1—thus has the same exact drawbacks as option 1, but with an additional drawback of not allowing shift adjustments to effectively be made. In this mode, the shifter hoods are upside down, operate directionally backward, and may interfere with the ground if there is inadequate clearance. The derailleur hangers are also upside down and may not function with typical tension—making any adjustments moot since the geometry is not the same as what is encountered in the riding position.

The leaning or holding of the bike method while occasionally lifting the back wheel of option 3 has the same drawbacks as option 1 however it has the added drawback of trying to keep the bike supported against the often very strong "spring force" required to physically move either the front or rear derailleur's via the shifter(s). Lifting the bike while also having to use a hand to simulate the pedaling motion does not even enable a single hand to activate shifters or make adjustments for a single person. Given the drawbacks discussed of all three methods currently available regarding bicycle drive train lubrication, adjustments or observation; the best case scenario typically provides either just one "free hand" to perform tasks—or requires a second person and is still overly challenging.

SUMMARY

In accordance with one embodiment; a motor assembly having a connection means to a bicycle pedal or crank arm is used to perform the task of turning the crank and related drive train on a bicycle while the bicycle is firmly held stationary by other means, most typically a bicycle repair stand.

DETAILED DESCRIPTION

A First Embodiment Pedaler Device

Figure 1:
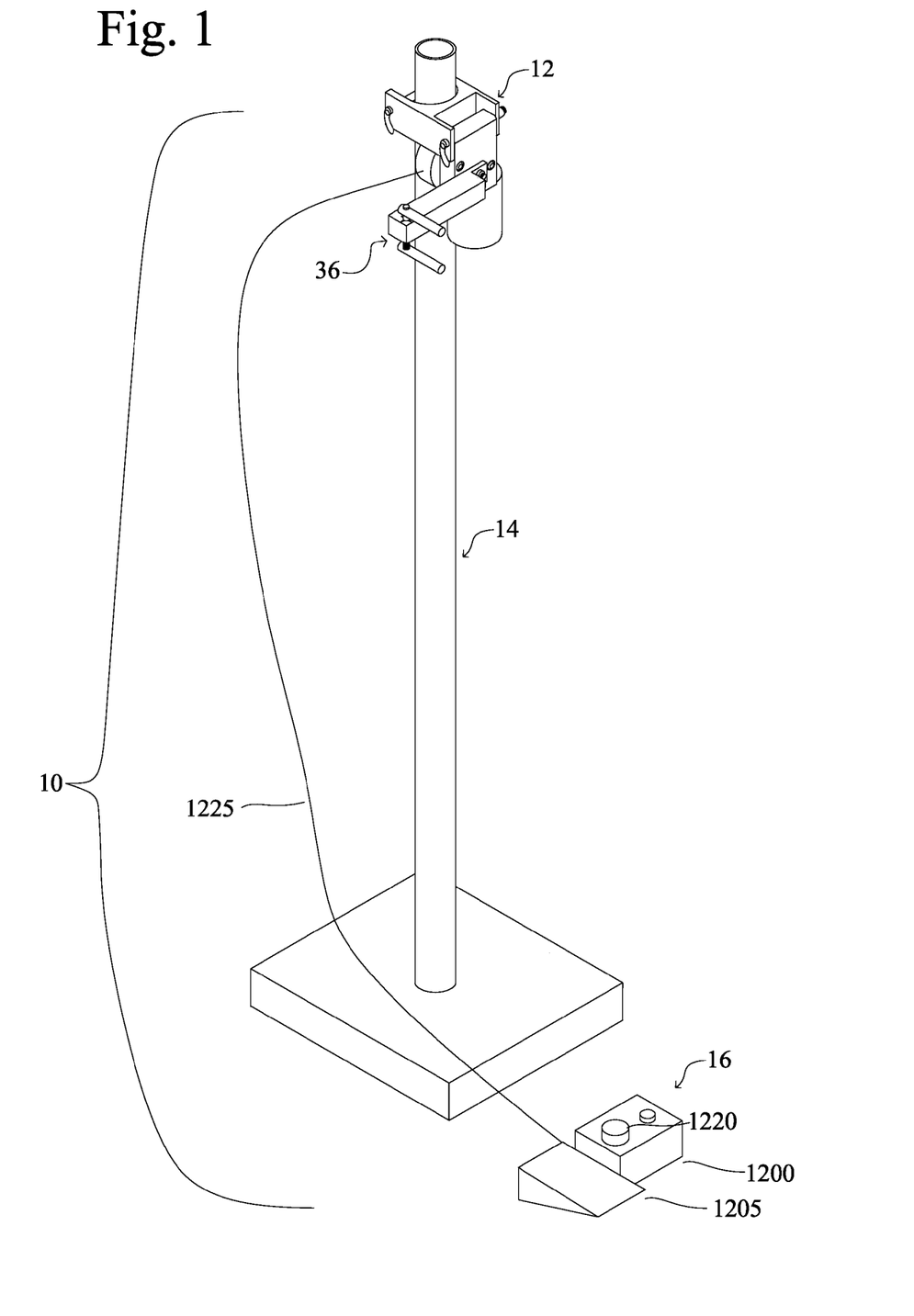
FIG. 1 is a perspective view of a fully assembled pedaler device according to one embodiment of the present invention

FIG. 1 illustrates an embodiment of the pedaler device 10. Generally, the device comprises (i) a motor assembly 12 including a motor 1600 and a crank interface arm 1700 and an associated connector mechanism 36 configured for removable attachment to a crank arm 190 of a bicycle drive train 24, (ii) a stand 14 for elevating and supporting the motor assembly, and (iii) a motor controller 16 for controlling the speed and rotational direction of the motor. The motor assembly further includes structure to permit the vertical position and angle of the assembly on the stand to be adjusted as is described in detail below.

Figure 1A:
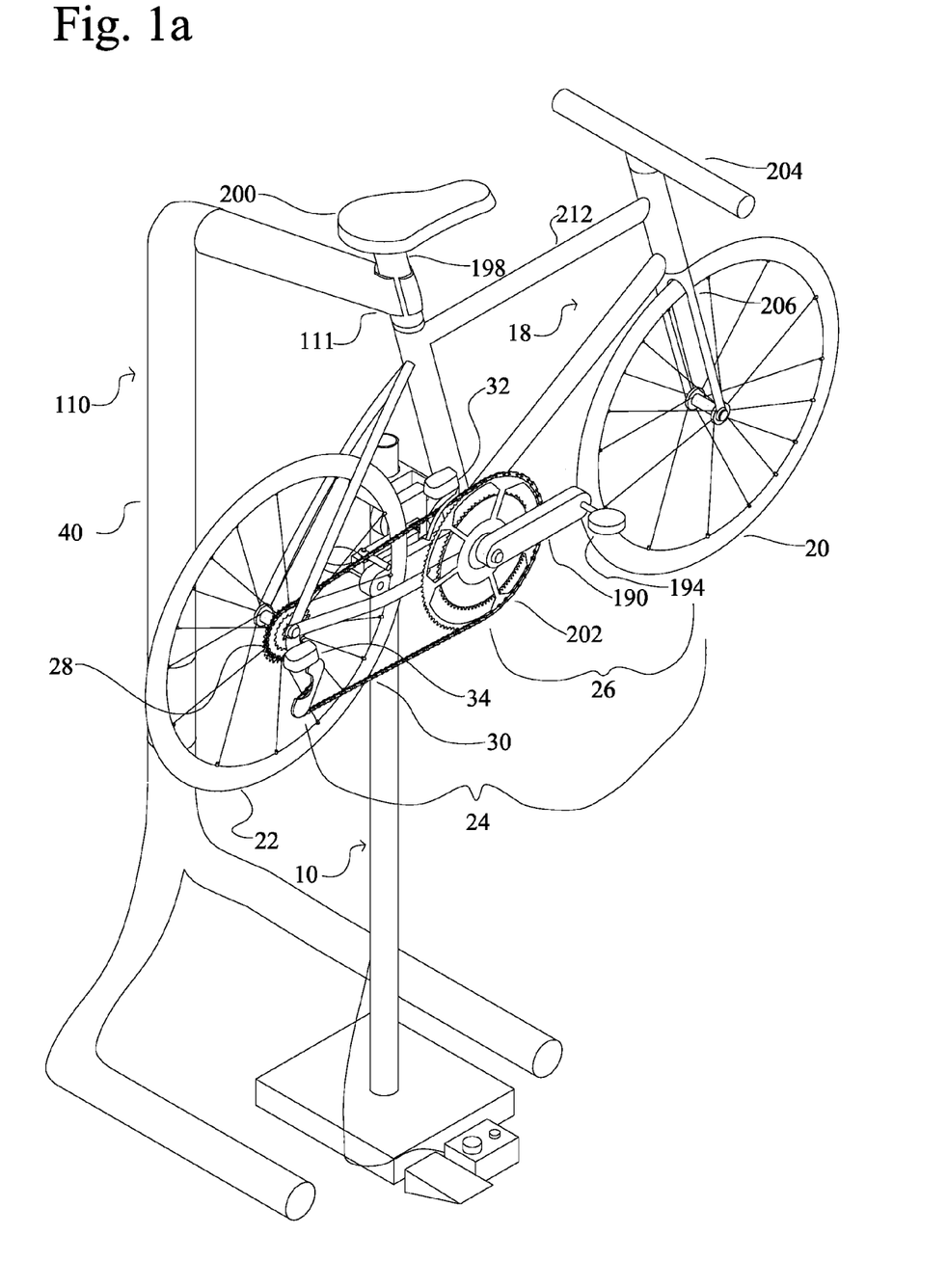
FIG. 1a is a perspective view of the pedaler device of FIG. 1 in operative combination with bicycle held in a bicycle repair stand according to one embodiment of the present invention. Of note, the left chainstay of the bicycle's frame is not illustrated as to not obscure the pedaler device.

FIG. 1a is an illustration of the pedaler device in combination with a bicycle 18 supported on a bicycle repair stand 110 in a typical operative configuration. The bicycle typically includes a frame 212 and a fork 206, front and rear wheels 20 & 22, a saddle 200, handlebars 204 and drive train 24. A typical drive train is chain driven and includes a crankset assembly 26, which comprises left and right crank arms 190, chainring(s) 202, a bottom bracket assembly (not shown), and pedals 194. The typical drive train further includes a cassette 28, one or more derailleurs 32 & 34 and chain 30 that extends around or through each of the chainrings, cassette and derailleurs. The cassette is operatively coupled to the rear wheel 22 to transfer propulsive force thereto.

Figure 2:
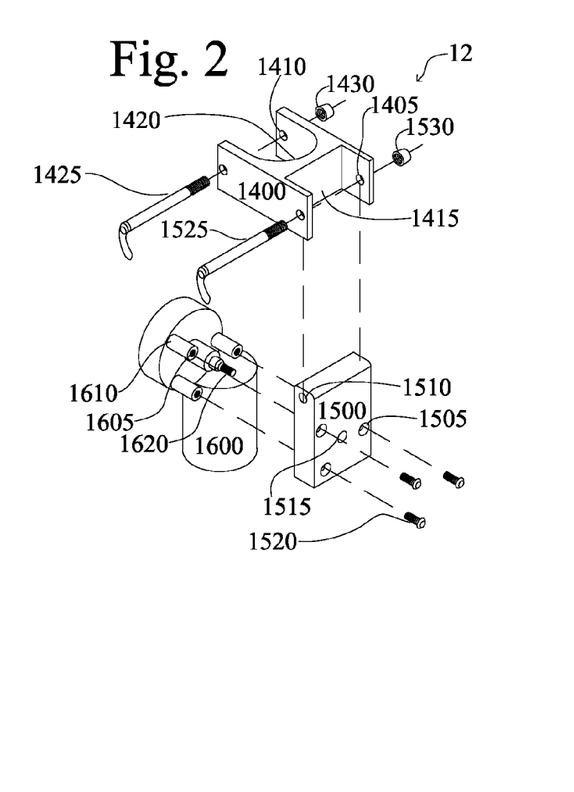
FIG. 2 is an exploded view of a motor plate, motor, motor carriage and related parts in more detail then FIG. 1 according to one embodiment.
Figure 3:
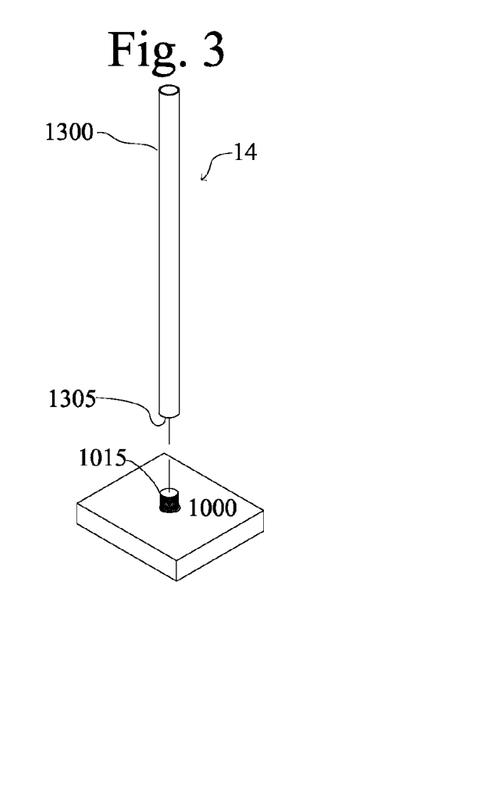
FIG. 3 is a significantly reduced scale and exploded view of a bike stand independent base plate and motor support shaft and related parts in more detail then FIG. 1 provides according to one embodiment.
Figure 4:
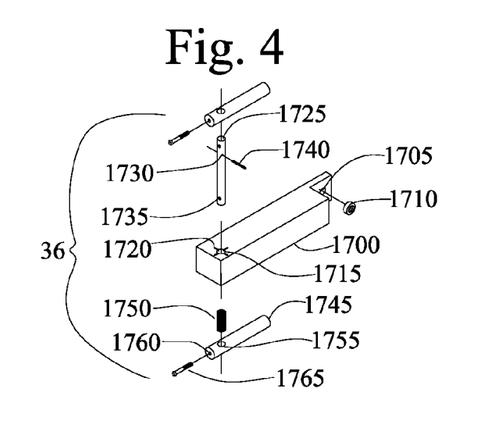
FIG. 4 is an exploded view of a crank interface arm assembly and related parts in more detail then FIG. 1 provides according to one embodiment.

FIG. 2 through FIG. 4 show in detail the parts required, assembly order and key characteristics in sufficient detail to describe one fully assembled pedaler embodiment 10 as shown in FIG. 1.

FIG. 2 shows an exploded view of the motor assembly 12 except for the crank interface arm, which is separately illustrated in FIG. 4. A motor front plate or plate 1500 frictionally connects a motor 1600 by passing a collection of bolts 1520 through corresponding through holes 1505 belonging to the aforementioned motor plate 1500 and into a series of threads 1605 contained within motor attachment points 1610; such that a motor output shaft 1620 passes fully through a motor shaft through hole or through hole 1515 bored through the aforementioned motor plate 1500. The orientation of said motor 1600 and pattern of said bolt holes 1505 and said bolts 1520 and said through hole 1515 depend upon the specific motor selected for the embodiment. According to one embodiment, said motor having demonstrated adequate torque and speed characteristics for the application is a Trico Part Number 23000387 or equivalent. Using this specific motor or equivalent, said motor plate 1500 is of roughly 3 inches in width, 3.5 inches in height and 1 inch in thickness and is made of plastic. Continuing to describe plate 1500, the back surface (surface that physically mates with the motor 1600) has countersinks (not shown) on said bolt holes 1505 and said through hole 1515 of roughly the same diameter of the motor attachment points 1610 and a motor output shoulder 1615 respectively to a depth such that when said motor 1600 is fully seated within said motor plate 1500, the aforementioned motor output shaft or shaft 1620 clears the front face of said plate 1500 with roughly 0.5 inches of threads available on the front side of the plate 1500. According to one embodiment, the depths of these countersinks are 0.25 of an inch. The aforementioned bolt holes 1505 are of roughly the same diameter of said bolts 1520 and also have countersinks (not shown) of minimum depth required to provide bolt heads of bolts 1520 to be nearly flush with front face of said plate 1500. According to one embodiment, the depths of said front face countersinks are 0.25 of an inch. Continuing to describe the orientation of said bolt holes 1505 and through hole 1515 within the front face of said plate 1500; all holes and corresponding countersinks are drilled into the face such that the aforementioned motor shaft 1320 is horizontally centered within the face of plate 1500 while on the vertical face the said motor shaft 1620 is 0.75 inches below the vertical center line. Plate 1500 also contains a through hole or hole 1510 of roughly 0.375" diameter on center of thickness of plate 1500 such that roughly 0.375 material remains above the through hole.

Continuing to refer to FIG. 2, a motor assembly carriage or carriage 1400 typically comprised of plastic has of initial dimensions of approximately 1.5 inches in height, 4 inches in both remaining dimensions. What could be considered a 1.5 inch high by 1.5 inch deep by 3 inch wide cube is removed or not casted from one centered end of said carriage 1400. A channel 1415 results in which aforementioned plate 1500 can fit. A pair of through holes 1405 of approximately 0.375" diameter vertically on center is drilled through both remaining edges of said channel 1415 such that approximately 0.375" of material remain on the outboard edges of said channel.

Carriage 1400 on the end opposite of aforementioned channel 1415 includes a large rounded slot 1420 of roughly 1.625" diameter on center in the vertical plane from the back edge of the carriage 1400 concluding at a point when roughly 0.5" of material remains at the narrowest point between the said slot 1420 and the back edge of aforementioned channel 1415. A pair of through holes 1410 of approximately 0.375" diameter vertically on center is drilled such that approximately 0.375" of material remains on the back edges of said holes and said carriage 1400.

Referring to FIG. 3 the stand 14 is illustrated. At a base end, it comprises a base plate or plate 1000 having dimensions of 18"×18"×1.5" that is made, according to one embodiment, of heavy plate steel. Centered within plate 1000 is a section of male threads 1015, which can be welded to plate 1000 or attached using another means, known to the art. The stand also comprises a tube 1300 having corresponding female threads 1305 mating with threads 1015 to attach to the base. Tube 1300 is made, according to one embodiment, of durable plastic having approximate dimensions of 1.625" diameter and roughly 40" in length. Referring to FIG. 4, a crank interface arm or arm 1700 is made, according to one embodiment, of plastic. The crank interface arm 1700 has dimensions of roughly 4" in length and 1" in both remaining dimensions followed by an approximate 1" length that is reduced to roughly 0.25" thickness. This reduction in thickness area, or shoulder; includes a through hole 1705 of roughly the same diameter as the aforementioned output shaft 1620 from FIG. 2. According to one embodiment, this hole is 0.25" in diameter and is centered within the shoulder. Arm 1700 also includes connector mechanism 36 for removably coupling the crank interface arm to a crank arm 190 of the crankset assembly 26. The connector mechanism comprises a through hole or hole 1715 in the crank interface arm of approximately 0.25" diameter bored in the plane perpendicular to hole 1705. Center of Hole 1715 is bored approximately 0.5" from all edges near a distal end of the crank interface arm such that the distance from hole 1705 and hole 1715 are all maximized. On center of hole 1715 and on both parallel and perpendicular axis to the long length of arm 1700 is bored an approximately 0.5" long×0.125" deep square trough 1720 such that a cross shape results. A connector shaft 1725 of roughly 0.25" diameter and 2.5" length made according to one embodiment plastic; passes through bore 1715. Connector shaft 1725 includes a pair of female threads 1735 centered within the same face of the connector shaft such that both centers of threads 1735 are approximately 0.375" from their respective ends of connector shaft 1725. Connector shaft 1725 also includes according to one embodiment a square through channel or hole 1730 of approximately 0.125" centered 0.75" below the top of connector shaft 1725 but perpendicular to holes 1735. A small square rod or retaining rod 1740 of metal having dimensions of 0.5" in length and 0.125" square is pressed into hole 1730 until centered. Onto the top of connector shaft 1725 is pressed one of two connector rods 1745 of approximately 0.5" diameter and 1.75" length by passing the top of connector shaft 1725 through a hole 1755 of approximately the same diameter of the connector shaft 1725. According to one embodiment, hole 1755 is 0.25" and connector rods 1745 are made of a hard rubber or semi-rigid elastomeric material. In other variations the rods can be made of plastic or metal and are often covered with a rubber or elastomeric sleeve. Hole 1755 is centered 0.5" from one end of each connector rod 1745. Connector rods 1745 also include a hole 1760 bored into the center of each rod of approximately the same diameters as aforementioned female threads 1735. According to one embodiment, holes 1760 are of 0.1875" diameter and are bored to a depth of approximately 0.75". The top connector rod 1745 is secured onto connector shaft 1725 by threading a retaining hardware or screw 1765. Connector shaft 1725 is then passed through aforementioned hole 1715 such that retaining rod 1740 is pressed into one of the two possible orientations provided by aforementioned trough 1720. On the remaining portion of connector shaft 1725 protruding from the underside of arm 1700 a spring 1750 is slid over connector shaft 1725 and compressed while the lower connector rod 1745 is installed following the same process as the top rod using a second screw 1765. According to one embodiment, spring 1750 is approximately 0.26" inside diameter, 0.75" in length and has a moderate K factor known in the art. The square trough 1720 in combination with the retaining rod 1740 as biased by spring 1750 acting through the connector shaft 1725 comprise a detent mechanism 38. Accordingly in operation, the top and bottom connector rods 1745 are able to rotate as a pair and be locked both parallel and perpendicular to the long axis of crank interface arm 1700 by the detent mechanism 38.

Referring to FIG. 1 and FIG. 4, the assembled crank interface arm 1700 is frictionally connected to the aforementioned motor output shaft 1620 by a nut 1710. The motor carriage 1400 and all installed parts are then frictionally engaged onto tube 1300 by pressing slot 1420 around tube 1300 followed by passing quick release 1425 through both through holes 1410 and securing with nut 1430. The motor 1600 is electrically connected to a motor controller 16 comprising power enclosure 1200 and a foot pedal 1205 by a communications cable 1225. The power enclosure contains electronics known to the art, which are therefore not required to fully described within this invention; however according to one embodiment based upon the aforementioned selection of a Trico Part Number 23000387 motor 1600 it is important to know that the enclosure 1200 according to one embodiment includes a varying voltage transformer from AC to DC voltage (not shown) with adequate wattage, being roughly 6 watts to power said motor 1600 from near zero voltage to maximum rated voltage of said motor based upon a varying supplied input AC voltage provided by a foot pedal 1205 by means of full wave rectification known in the art. Based upon one embodiment, pedal 1205 may be a "Moto-Tools Foot Pedal" or equivalent. The DC output of aforementioned transformer fully rectified then electronically connects to a directional control device or direction switch 1220 before connecting to aforementioned communications cable 1225.

Referring back to FIG. 1a, a typical bicycle repair stand 110 is shown having a mostly vertical tubular rod or tube 40 which is connected to the remaining components known in the art, such as a clamp or stand clamp 111. Also known in the art—a bicycle has a seat or saddle 200 installed onto a seat post or post 198. Said post 198 installs into a frame 212 connecting in several points to a bottom bracket (not shown). Within the art related to work stands, varying designs support the bike by typically a stand clamp 111 which may attach to post 198 or frame 212. My invention is not specifically based upon any single existing art designs as they relate to bicycles or bicycle repair stands themselves.

Figure 5:
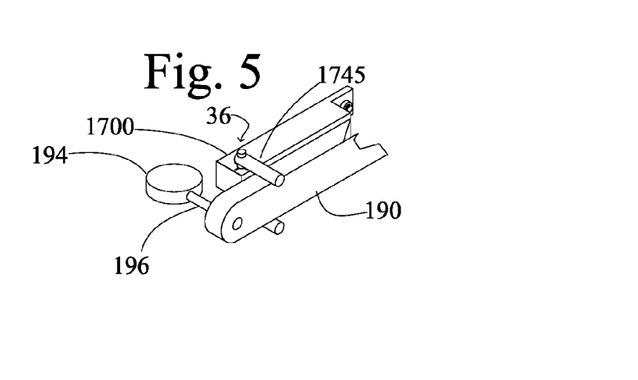
FIG. 5 is a perspective view of a correctly installed/positioned crank interface arm according to one embodiment.

Referring to FIG. 1a & FIG. 5, the crank arms 190 rotate around an imaginary centerline of the bike crankset assembly 26. Front chain ring 202 is connected using a chain 30 to a rear wheel 22, which is connected to aforementioned frame 212 through a part of the frame known in the art as a rear triangle. Known to the art of bicycles, the drive side is considered the side of the bicycle that includes the chain, chain ring and other related components. Additionally, said frame 212 is connected to a front wheel fork 206 which mounts a front wheel 20. Said fork 206 steers the bike by turning a handlebar 204. For the Currently described embodiment and to discuss operations of this primary embodiment, the bicycle should be installed into the stand clamp 111 in a way commonly known in that art, such that the non drive side crank arm 190 and said crank arm's pedal 194 (if installed on the bike) orient to the aforementioned crank interface arm 1700, and the pair of connector rods 1745 as shown in FIG. 5. The orientation is such that the centerline of the aforementioned output shaft 1620 closely approximates a continuation of the aforementioned centerline of the bike crank. By operating quick releases 1425 and 1525 reasonable efforts can be made to both the height and angle of the output shaft 1620 to approximately match this aforementioned centerline of the crank. Moving entire base 1000 adjusts horizontal positioning. FIG. 5 shows an exploded partial view of just one such possible positioning. Before covering operation of the invention, absolute perfect alignment between the centerline of the output shaft 1620 and the imaginary centerline of the bike crank is not required. To summarize one example of static orientation of the currently described embodiment as it relates to the bike; the overall circular path of the pair of connector rods 1745 is such that they combine to engage both related edges of the crank arm 190 without interfering with the bike frame 212 and any other installed equipment.

Operation of the First Embodiment Pedaler Device According to an Embodiment

The preceding description of the currently described embodiment results in a ready to operate invention. During operation, the pedaler 10 is supplied an AC voltage in increasing value as the speed pedal 1205 is depressed in an increasing amount. This increased voltage AC results in a proportional increased output DC voltage from the variable voltage transformer combined with full wave rectification (not shown). Said DC voltage is supplied to the motor 1600 with a polarity selected by direction switch 1220 over communications cable 1225. The DC voltage and the specific characteristics of Motor 1600 determine at what RPM—or cadence the output shaft 1620 will turn. As the output shaft 1620 rotates at a speed proportional to the depression of the speed pedal 1205, the crank interface arm 1700 and ultimately the pair of connector rods 1745 turn at the exact same speed. Due to the temporary connection established between the insides of each connector rods 1745 and each outside edge of aforementioned crank arm 190, regardless of the direction of motor rotation selected via direction switch 1220 the non drive side crank arm 190 all related components to the drive train (chain rings, chains, rear cassettes, rear hub idler pulleys, derailleurs, etc. . . . ) will also operate as established within the art. If the direction switch 1220 is selected for reverse operation, the connector rod 1745 drawn on top based on FIG. 5 is the primary connection point to the bicycle crank arm 190. If the direction is forward, the bottom connector rod 1745 in FIG. 5 is the primary connection point. The force provided by the motor 1600 is transferred to the crank arm 190 through the primary single connector rod 1745 while the other provides support to the other edge of the crank arm 190 to minimize chatter, to stop the crank arm from over rotating after power to the motor is removed and to quickly allow the direction switch 1220 to be changed without requiring the crank interface arm 1700 to move around to the other side of the rotation to engage the crank arm 190. If the direction control is set for reverse, the bicycle rear wheel 22 may rotate a small amount caused by simple friction; however all other components operate based upon their respective ratios as they relate to the motor speed.

A low motor speed pedal setting combined with a low bicycle gearing selection known to the art, such as a 34/25 ratio would result in the chain and other drive train components to turn at a slow but approximately steady pace. This typical combination may be suited for inspection of drive train parts, observation, cleaning of components or application of lubrication. For instance, with two hands free with the chain (not shown) rotating at a slow pace, an operator of the invention can use one hand to hold a rag around the chain while the other hand of the operator allows specific desired quantities of agents to be applied judiciously. Front chain ring 202, the rear cassette (not shown) and idler pulleys (not shown) can also be cleaned much more effectively then currently known in the art in this manor. Letting off the speed pedal 116 while the direction switch 1220 is set for reverse will result in near immediate cessation of rotation of all parts. Changing direction switch 1220 will result in the motor rotation changing to the alternate mode. It is important to note that the direction switch 1220 and thus bicycle drive train direction affects the forces the motor 1600 will overcome during operation. In reverse, the motor overcomes just the built in friction of the overall system. In forward operation, in addition to built in friction, the motor also provides the force to rotate the mass of the rear wheel (not shown) at a speed based upon the gear ratio of the bicycle currently selected via the shifters (not shown) and the amount the speed pedal 1205 is depressed.

Within the currently described embodiment, a motor equivalent to a Trico Part Number 23000387 in use with a 6 watt variable AC to DC transformer and a Moto-Tools foot pedal the maximum RPM of the motor closely resembles the human range of pedaling cadences—from 0 to approximately 110 rotations per minute with realistic torque capabilities to operate a gearing ratio of 53/11—a relatively high ratio known to the art of a bicycle The invention in this currently described embodiment may spin a 700/23c rear wheel with a 53/11 gear ratio at speeds known in the art of bicycling to be high, possibly surpassing 35 miles per hour. At an operating speed near maximum followed by removing forward power from the motor, the crank arm 190 and connected drive train components stop, however the cassette 28 and rear wheel 22 continues to rotate as well known in the art until friction forces stop the operation. The scenario described above alleviates the existing art issue of not easily being able to diagnose or test resultant repairs of high speed wobbles within the rear wheel—or issues or sounds emanating from high speed rotation of the free hub.

Using a hand on a crank arm 190 or pedal 194 to try to obtain let alone sustain the types of speeds aforementioned is simply impractical. Additionally, if there are drive train rotation specific issues only presenting themselves at a very high cadence such as squeaks, rattles or other common problems, these are challenging to distinguish or isolate when using a hand to rotate the crank arm 190 or pedal 194 due to the challenge of smoothly rotating the drive train by hand. Depressing the speed pedal until a desired speed is achieved alleviates this and creates a smoother and lower noise power distribution to the drive train. Lastly, while operating with a forward direction, adjusting actual shift indexes known to the art is not as difficult or dirty or as dangerous as currently known to the art.

Discussing first the safety improvements of my invention over known art relates to vision and focus. Using a hand to turn the crank arm 190 or pedal 194 or relaying commands to a helper requires its own focus. Trying to turn derailleur limit stops known to the art (not shown) using a screw driver or similar tool in close proximity to rotating parts is potentially dangerous. Occasionally it is unavoidable in this mode to not shift the eyes to ensure that the hand or helper is effectively turning the drive train. It is simple to accidently lose focus for a split second due to a change in speed or a slip of a hand and get a tool shaft or worse yet a finger into the path of a moving object. Additionally a repetitive motion injury can occur after manually turning a drive train with a muscle group that isn't used to this type of motion. Operation of my invention improves these safety concerns due to use of the foot based speed pedal 1205 and related parts to perform the drive train motion related tasks at a relatively constant and on an easier to maintain basis. This leaves the eyes and mind to better focus on the task at hand. Limit stops can be adjusted in smaller amounts due to having two hands free to turn the stop at a finer amount. This also reduces the likelihood of throwing the chain during the adjustments which can cause serious damage to bike finishes or equipment. In addition to making safety improvements over known art, operation of my invention also makes shift index adjustments easier to perform. At best—the drive train can be turned by known art while adjusting the appropriate barrel to minimize drive train noise to estimate the appropriate value. Regardless, the new value needs to be tested by activating the appropriate shifter (not shown). As discussed in the prior art section, this involves usually switching hands—from pedal 194 to the appropriate shifter (not shown). This is time consuming and frustrating due to the ease of which it is forgotten how much a barrel has been turned already and in what direction between these switches. Plus grease, dirt and grime from the pedal are easily transferred onto the handlebar 204 which can ruin bar tape (not shown) or can place lubricants which can find their way later into the eyes of the rider. Since my invention results in both hands being free, typically the left hand can be dedicated and used to turn the appropriate barrel bolt while the right activates the correct shifter. The invention can operate at the nearly same cadence through out the shift process just as a rider typically does during riding. Since the adjusting hand is still on the barrel being adjusted, muscle memory and reduced time lapse makes more refined changes in the appropriate direction faster. The smoother and more consistent power delivered by the invention to the drive train reduces the lag observed when trying to shift with one hand while trying to continue turning the crank arm 190 or pedal 194 further reducing time and frustration levels associated with the task of shift index adjustments using known art.

Lastly in operation of my invention the device can effectively be used as a brake against rotation of the drive train during static cleaning or static work. If there is a single problematic chain link for instance or a single spot on a chain ring that requires investigation using known art it is tough to keep the drive train from moving if the bicycle is simply held in a repair stand. If no power is provided to motor 1600 while the pair of connector rods 1745 are both engaged with the crank arm 190; then it is next to impossible to actually turn the motor identified in the currently described embodiment. The gearing is such that motor 1600 for all practical environments will keep crank arm 190 and thus drive train parts from moving aside from any minor play in the overall system.

On occasion it may still be desirable to manually turn the crank arm 190 or pedal 194 using a hand or other prior art method in order to check for issues involving stiffness or looseness in the crank itself. In these situations, the pair of connector rods 1745 can be rotated 90 degrees such that they are parallel to crank arm 190 which allows crank arm 190 to pass by the invention entirely—or the entire base 1000 can be moved such that the invention no longer temporarily connects to the crank arm 190.

A Second Embodiment Pedaler Device

Figure 2A:
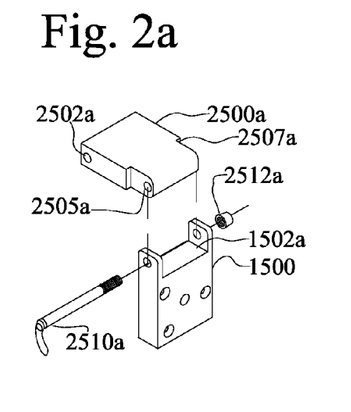
FIG. 2a-2b are perspective views of alternate motor carriages, motor mounting options and optional parts for increased adjustability in accordance with other embodiments.

Referring to FIG. 2a and comparing with FIG. 2, the motor plate from FIG. 2 has been modified to include a removed channel 1502a having a depth of material removed to roughly 1 inch (leaving roughly 0.5 inch material remaining between the top bolt hole 1505 and the bottom of said removed channel 1502a) and on center of plate 1500 to an overall width of roughly 2.5 inches, leaving two 0.25 inch "ears" containing the now two through holes 1510. Within the aforementioned removed channel 1502a drops an optional extension 2500a having the same original dimensions of the aforementioned motor plate 1500 with a through hole 2502a similarly placed and dimensioned to the through hole 1510 and a through hole 2505a of same dimensions (size and spacing from end) as hole 2502a. The end of the optional extension 2500a includes a reduction in width of 0.25" on each edge to result in a shoulder area 2507a such that the resultant nose of 2500a drops into removed channel 1502a. All other components can be considered to be the same as the main embodiment with the following exception, rather then quick release 1525 passing through hole 1510 from FIG. 2, it instead passes through hole 2502a

Operation of the Second Embodiment Pedaler Device

The proceeding section as it relates to FIG. 2a describes the addition of an optional extension into the main embodiment for additional adjustability. During operation, this adjustability comes into play to provide more angular (pitch) and height control of the system. Rather then describing the operation from start to finish in much overlap from the first embodiment, just the additional features or operations are described.

The quick releases 1525 and new quick release 2510a can be used in combination to tilt and effectively raise, lower and move outward and inward the motor plate and effectively the relationship between the connector rods 1745 and the crank arm 190. This can be used to reduce frequency of moving the entire system.

A Third Embodiment Pedaler Device

Figure 2B:
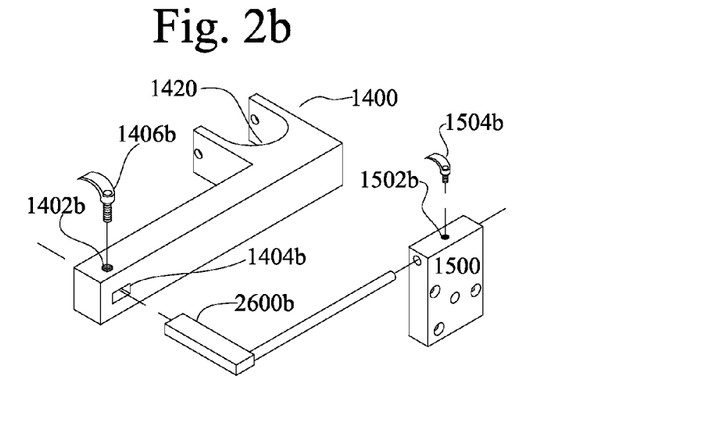

Referring to FIG. 2b and comparing with FIG. 2, the motor carriage 1400 first described in the main embodiment has several modifications. Channel 1415 is not removed. Through hole 1405 is not drilled and lastly a 1.5"×1.5"×7" long plastic or alternate material piece is added to one side of the outside edge in the same plane as through holes 1410 following the original inside extruded line of what would have been channel 1415. Vertically centered and 1.5" horizontally inboard of the outside edge of newly formed L shape within carriage 1400 is bored a through channel 1404b of rectangular shape having the vertical dimension 0.5" wide and the horizontal dimension being 1" wide. On the top service of carriage 1400 and on center of through channel 1404b is a threaded hole 1402b to a depth piercing into the top of slot 1404b. Through said through 1404b passes a rectangular 0.5" high by 1" wide section of a generally L shaped shaft or L Shaft 2600b and is frictionally locked by locking lever 1406b. On one end of the male rectangular rod portion of L Shaft 2600b is a round shaft portion of 0.375 inch diameter and 7" in length added on center 0.375" from the outside edge of the rectangular portion. A motor plate 1500 is the same from the first embodiment except for the addition of a threaded hole 1502b on center of the top of the plate piercing through the top of through hole 1510. The round shaft portion of 2600b passes through hole 1510 and is frictionally locked into position by a locking lever 1504b. Referring to FIG. 1 and FIG. 2b; Carriage 1400 is frictionally locked to the support tube 40 by pressing tube 40 into tube slot 1420 and frictionally securing with quick release 1425 and nut 1430. All remaining portions of the embodiment of the invention not specifically covered within this alternate embodiment follow the main embodiment.

Operation of the Third Embodiment Pedaler Device

The preceding describes in detail the modifications to the first embodiment as shown in FIG. 2b to connect the system directly to a bicycle repair stand 110 rather then a support tube 1300. This removes need for base plate 1000 and tube 1300 entirely and thus requires modified operation from the main embodiment; but with only the following modifications (all others are retained).

Operating quick release 1425 allows carriage 1400 and thus device to adjust height relative to the bicycle crank centerline described in operation of the main embodiment by moving up and down the work stand 110 itself rather then a support tube 1300. Operating locking lever 1406b allows the motor plate and thus crank interface arm 1700 and related parts to move horizontally inward and outward as needed in relation to the bicycle crank arm 190 to achieve orientation as shown in FIG. 5 Operating Locking lever 1504b allows motor plate 1500 and thus all other parts to slide along the round shaft portion of L shaft 2600b while also allowing motor plate 1500 to rotate along said L shaft 2600b to approximately match both angle and positioning as shown in FIG. 5. All other operations continue from the main embodiment.

Fourth and Fifth Embodiment Pedaler Devices

Figure 3A:
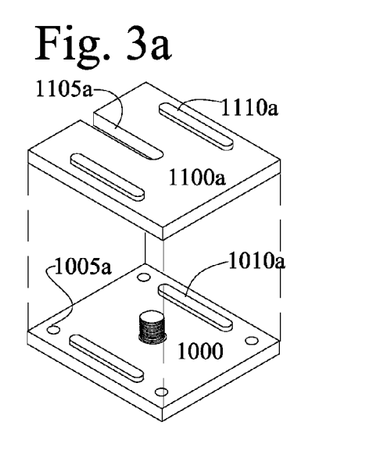
FIG. 3a-3b are perspective views of various support structures in accordance with other embodiments.

Referring to FIG. 3a and comparing to FIG. 3, Base Plate 1000 has been reduced in thickness to 0.75" and includes 4.5" diameter holes 1005a roughly 1" on centers of all 4 corners. 1000 also includes two male ribs 1010a having roughly a half cylinder shape of 0.5" width, 0.375" height, 10" long centered 1" from two parallel edges. A weight plate 1100a having identical basic dimensions to plate 1000 and ribs 1110a matching dimensions and placement of ribs 1010a. Weight plate 1100a also includes a large slot 1105a of same diameter and to the back side of threads 1015 on center, and parallel to male ribs 1110a. Weight Plate 1100a lastly includes female slots (not shown) on the underside of the plate such that when weight plate 1100*a* rests on top of plate 1000, the male ribs 1010*a* from plate 1000 slip into the aforementioned female slots of weight plate 1100*a*.

Figure 3B:
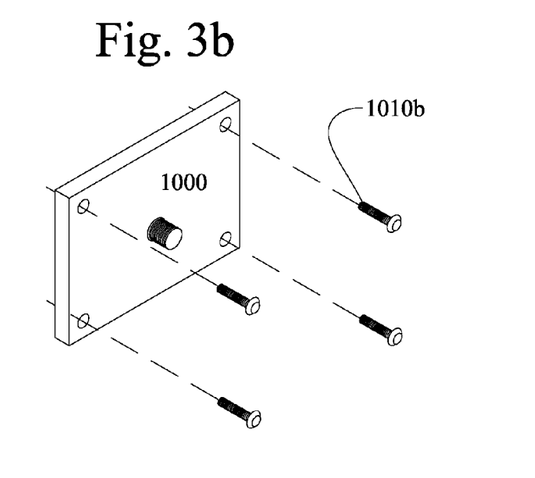

Referring to FIG. 3*b*, base plate 1000 may be semi permanently secured to a wall, floor, ceiling or other adequately supported location by use of hardware 1010*b*. In semi permanent mode, tube 1300 may be cut to an appropriate length. Ribs 1010*a* are not required. All remaining portions of the embodiment of the invention not specifically covered within this alternate embodiment follow the main embodiment.

Operation of the Fourth and Fifth Embodiment Pedaler Device

The preceding describes two embodiment modifications where base plate 1000 can be split into multiple smaller plates for ease of carrying as well as situations where a thinner plate 1000 can be affixed directly to a sound material such as a wall, ceiling or floor. In both cases the operation of the invention is the same as the main embodiment with the exception of horizontal attachment of the base plate 1000 to a vertical service such as a wall. In this case, the primary operational difference involves how quick releases 1425 and 1525 affect orientation of crank interface arm 1700 in relation to the invisible centerline of crank arm 190. Quick release 1425 provides inward adjustability (instead of vertical) while 1525 adjustment continues to provide angular control. The centerline of motor shaft 1620 shall still approximately match the invisible centerline of crank arm 190, after which all operation follows the operation of the main embodiment.

Sixth Embodiment Pedaler Device

Figure 4A:
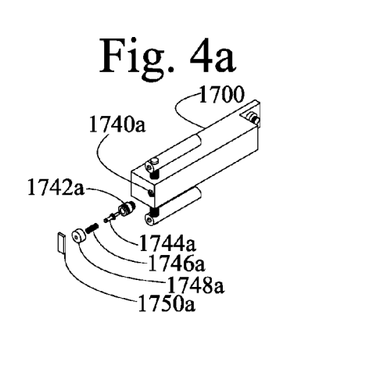
FIG. 4a-4e are perspective views of motor to bicycle connection options in accordance with other embodiments.

Referring to FIG. 4*a* and comparing to FIG. 4, from crank interface arm 1700 from FIG. 4, channel 1720 is excluded. Connector shaft 1725 excludes through channel 1730 and adds two intersecting through holes on center of roughly 0.125" diameter such that one is parallel to female threads 1735 and the other perpendicular. (holes not shown). Spring 1750 is removed. Retaining rod 1740 is removed. Crank interface arm 1700 adds a Recessed Holes and Threads area 1740*a* existing On vertical center and horizontal plane of through hole 1715. 1740*a* consists of an on center 0.125" diameter hole drilled to penetrate into through hole 1715 and a larger concentric female threaded area to a depth of roughly half the depth of the aforementioned 0.125" diameter hole. Into the female threads screws a pinball style plunger combination of a barrel 1742*a*, a plunger 1744*a*, a spring 1746*a*, a cap 1748*a* and a Tee handle 1750*a* known to the art. The tip of plunger 1746*a* frictionally engages into either intersecting through holes added to connector shaft 1725 to secure in 90 degree increments. All remaining portions of the embodiment of the invention not specifically covered within this alternate embodiment follow the main embodiment.

Operation of the Sixth Embodiment Pedaler Device

The preceding describes use of a locking crank interface arm plunger as shown in FIG. 4*a* to control orientation of both connector rods 1745 in relation to crank interface arm 1700. In operation, this alternate embodiment follows the operation of the main embodiment with the following exception. Rather then compressing spring 1750 while turning connector rods 1745 either perpendicular or parallel with the crank interface arm 1700 to engage/disengage the invention, the tee handle 1750*a* is pulled outward, compressing spring 1746*a* and plunger 1744*a* is pulled out of connector shaft 1725 allowing the shaft 1725 and thus connector rods 1745 to rotate in relation to crank interface arm 1700.

Seventh Embodiment Pedaler Device

Figure 4B:
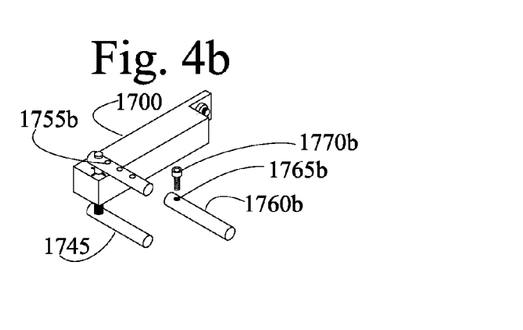

Referring to FIG. 4*b* and comparing to FIG. 4, connector rods 1745 have been modified. Several Holes 1755*b* of roughly 0.125" diameter in the same vertical plane as holes 1755 have been added to connector rods 1745 to a depth of roughly 0.25". An extension rod 1760*b* of roughly 0.5" diameter inside wall thickness and 0.75" outside diameter of approximately 1.5" length includes a female threaded area 1765*b* through one wall. 1765*b* is roughly 0.25" on center from one end. Through threads 1765*b* and into an appropriate hole 1755*b* screws a set screw 1770*b* to frictionally attach one extension rod 1760*b* to each connector rod 1745. All remaining portions of the embodiment of the invention not specifically covered within this alternate embodiment follow the main embodiment.

Operation of the Seventh Embodiment Pedaler Device

The preceding describes use of extension rods 1760*b* added to both connector rods 1745. In operation, this alternate embodiment follows the operation of the first embodiment with the following exceptions. The entire invention can be oriented to increase distance between the nut 1710, connector rods 1745 and crank arm 190 without moving base plate 1000 as noted in the main embodiment. This can be achieved by loosening set screws 1770*b* and sliding rod extensions 1760*b* along connector rods 1745 until a proper fit such that extension rods 1760*b* become the connection points to crank arm 190 rather than the connector rods 1745.

Eighth Embodiment Pedaler Device

Figure 4C:
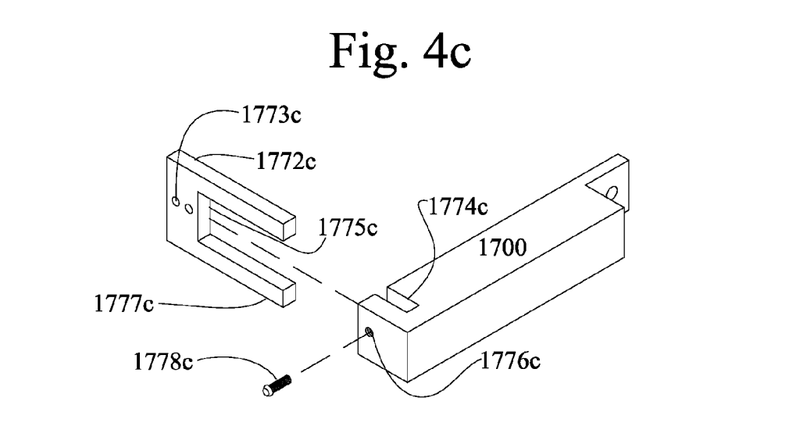

Referring to FIG. 4*c* and comparing to FIG. 4, crank interface arm 1700 and related parts are significantly modified. 1700 retains basic dimensions but removed are through hole 1715 and channel 1720. A rectangular clip channel 1774*c* of roughly 0.25" wide is removed from the back surface of crank interface arm 1700 moving towards the front surface such that 0.25" of material remain on both the front face and end of 1700 furthest from through hole 1705. A female threads 1776*c* vertically on center and approximately 0.25" from the back surface of crank interface arm 1700 continues into the aforementioned clip channel 1774*c*. A roughly horseshoe shaped preformed clip 1772*c* of roughly 0.25" thick rubber or other suitable material includes a rectangular removed area 1775*c* which allows preformed clip 1772*c* to slide forward and bottom out within front face of rectangular clip channel 1774*c* leaving a pair of Clip ends 1777*c* to protrude roughly 1.5" beyond the front face of crank interface arm 1700. According to one embodiment, removed area 1775*c* is 1.5" high and 3" deep and full size of 1772*c* including removed area 1775*c* is 0.25" thick, 2" high and 3.25" long. Through A pair of through holes 1773*c* vertically on center and approximately 0.25" from each remaining edge of preformed clip 1772*c* can pass a set screw 1778*c* to frictionally secure the clip 1772*c* within crank interface arm 1700.

Operation of the Eighth Embodiment Pedaler Device

The preceding describes use of the preformed clip 1772*c* in place of connector rods 1745 and related hardware shown in FIG. 4. In operation, this alternate embodiment follows the operation of the main embodiment with the following exceptions. Proper alignment shown in FIG. 5 and described in the main embodiment is achieved when Clip ends 1777*c* engage both edges of crank arm 190 rather then connector rods 1745. Set Screw 1778*c* can be loosened and preformed clip 1772*c* can be adjusted within clip channel 1774*c* and set screw retightened to frictionally lock preformed clip 1772*c* in place. When required, disengaging the entire device may be achieved by loosening set screw 1778*c* and simply removing preformed clip 1772*c*. All remaining portions of the embodiment of the invention not specifically covered within this alternate embodiment follow the main embodiment.

A Nineth Embodiment Pedaler Device

Figure 4D:
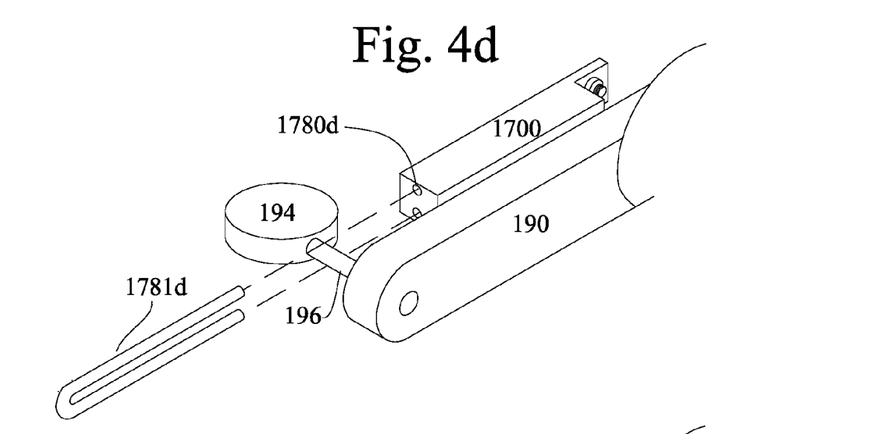

Referring to FIG. 4d and comparing to FIG. 4, crank interface arm 1700 and related parts are modified to change the temporary connection means to the bicycle from the crank arm 190 to a pedal shaft 196. The crank interface arm 1700 from FIG. 4d has the same basic dimensions from the main embodiment but with the following modifications. Through hole 1715 and channel 1720 are excluded. A pair of bores 1780d of roughly 0.25" diameter, horizontally on center and on center 0.75" apart to a depth of 1.5" are added. A rod fork 1781d or u-shaped member frictionally locks by sliding fully into the bores 1780d while pedal shaft 196 is contained inside the u-shape. According to one embodiment, rod fork 1781d is preferably made of rubber, has round ends of roughly 0.25" diameter and a total length of 4".

Operation of the Nineth Embodiment Pedaler Device

The preceding describes use of the rod fork 1781d in place of connector rods 1745 and related hardware shown in FIG. 4. In operation, this alternate embodiment follows the operation of the main embodiment with the following exceptions. All clearance and alignment considerations surrounding connector rods 1745 and crank arm 190, frame 212 and the invisible centerline of the bottom bracket are replaced with proper installation occurring when pedal shaft 196 is contained within the U shape of rod fork 1781d and crank interface arm 1700 during rotation adequately clears all bike components. Rod fork 1781d contacts with the pedal shaft 196 rather then crank arm 190. When required, disengaging the entire device may be achieved by pulling 1781d out of both holes 1780d and setting aside.

A Tenth Embodiment Pedaler Device

Figure 4E:
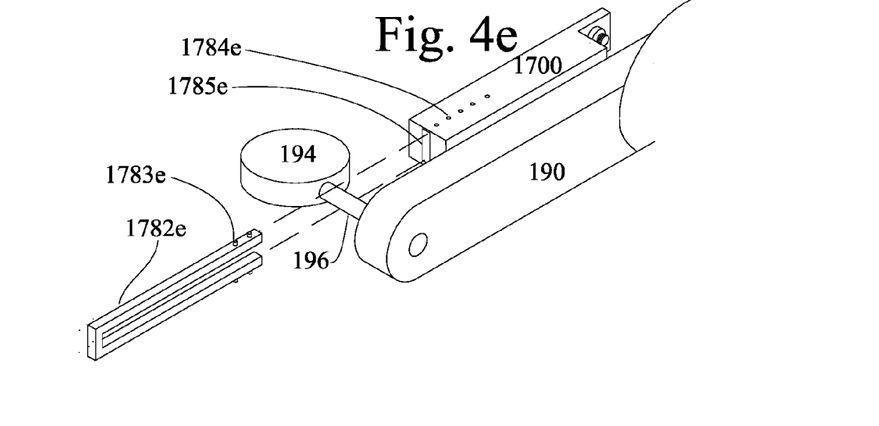

Referring to FIG. 4d and comparing to FIG. 4e, crank interface arm 1700 and related parts are modified. Rather then using two holes 1780d, a rectangular shaped 0.25" wide by 1.25" high by 1.5" deep rod fork channel bore 1785e is added to crank interface arm 1700. Roughly on center and at 0.25" intervals, 0.125" diameter through holes 1784e are drilled on both the top and bottom surfaces of 1700 such that they terminate into the rod fork channel bore 1785e throughout the depth of 1785e. A springed rod fork 1782e also a u-shaped member is similar dimensions to 1781d however instead of being round in shape, 1782e is square. 1782e also is typically made of a plastic material such as delrin such that the relaxed position of the ends of 1782e yields a total height of the top of one end to the bottom of the second end to be approximately 1.28". The K force of the springed rod fork should approximately be such that with a mild amount of hand force the aforementioned height reduces to 1.1" without permanently bending the spring rod fork 1782e. 0.25 inches from each the top and bottom outside services and 0.25" on center of 1782e are two retention pins 1783e of 0.12" diameter and 0.1" tall above the surface of 1782e. Applying adequate squeezing pressure to springed rod fork 1782e allows the ends and subsequently retention rods to pass in and out of rod fork channel bore 1785e and through holes 1784e. Proper installation and operating instructions then follow embodiment 4d.

From the description above, a number of advantages of some embodiments of my hands free bicycle pedaler become evident as listed below. It is to be appreciated that all advantages are not necessarily present on all embodiments.

(1) An operator of my device can observe a bicycle drive train's operation without having to rely on a hand or a helpers' hand to turn a crank arm or pedal providing more focus on the specific objective, whether it be searching for sources of rattles, wobbles or squeaks.

(2) Cleaning bicycle drive train parts such as chains, chain rings, cassettes or the rear wheel rim is made an easier task due to having the freedom to use both hands to firmly and safely hold rags or other items with more focused vision and better grip.

(3) Applying lubricants or other treatments to a bicycle chain is a more reliable task due to a steadier and slower rotational speed of the chain then what a hand or helper is capable of.

(4) Applying lubricants or other treatments to a bicycle chain is a quicker and easier task due to the fact that one hand can apply treatments while the other removes the excess at the same time, avoiding starts and stops.

(5) Adjusting bicycle drive train limit stops and shifting indexes are an easier task. A smooth, consistent and hands free rotational rate of the drive train allows one hand the freedom to dedicate to adjusting the appropriate limit stops or shifting index barrel while the other hand can activate the appropriate shifter for testing. Muscle memory and lack of having to multi-task to keep the drive train going with a hand makes the adjustment process quicker and easier.

(6) Allowing one hand to dedicate to making adjustments while the other hand dedicates to operating the appropriate shifter reduces the likelihood of transferring grit, grease or other unsightly and possibly hazardous chemicals to the bar tape and potentially into the riders' eyes later.

(7) Allowing both hands to grip a tool or other item while maintaining visual focus on a rotating back wheel makes limit stop adjustments safer with the reduction of the likelihood that a tool or finger or other body part enters the rotational path of the bicycles' drive train.

(8) Rotational speeds not practical to attempt during bicycle maintenance with current art can be achieved and sustained to diagnose and test fixes for speed wobbles, free hub noises or other related issues.

(9) Existing bicycle work stands, benches or other stable method to secure the bicycle known to the art are compatible without modifications.

(10) Existing bicycle designs of wheels, drive trains, frames, crank arms, pedal systems and other components known to the art are compatible without modifications.

(11) Minimal floating surface contacts between my device and the bicycle only in locations designed for contact (such as pedals, pedal shafts and crank arms) protects other more expensive cycling components such as frames from undo contact.

(12) A non-powered embodiment can work as a brake or a sort of lock out to keep a bicycle crank and thus other drive train parts from rotating when it isn't desired while continuing to provide both hands for productive work.

(13) The small foot print required and capability to power directly from a source such as a cigarette lighter helps maintain equipment where otherwise it might be difficult due to a lack of hand cleaners or other items being readily available.

(14) Engaging and disengaging my invention from a bicycle by multiple means provides methods to remove the invention from the system without disassembly.

Conclusion and other Embodiments

Accordingly, the reader will see that, according to one embodiment of the invention, I have provided a device capable of providing hands free operation of a bicycle drive train system to help with cleaning, maintenance and observations while said bicycle is connected to any number of repair stands currently on the market or ones that may enter the market. This has many improvements over current art described above.

While the above description contains many specificities; these should not be construed as limitations on the scope of any embodiment, but as exemplifications of the presently currently described embodiments thereof. Many other ramifications and variations are possible within the teachings of the various embodiments. Some examples of these being, 1) Due to the wide number of motor types and designs, one may prove to be more efficient then the currently described embodiment.
2) The motor plate, crank interface arm, motor carriage or other parts may be made of materials other then plastic. Aluminum, steel or other metals or alloys and other materials suitable for marketing purposes may be preferable in the manufacturing process.
3) Specific hardware choices such as locking levers, bolts and others may be altered for other similar designs such as quick releases, clamps and the like common to the art.
4) The specific dimensions of the crank interface arm, motor plate, top plate connector rods, may be increased or decreased based on desire to increase or decrease adjustability of the system or the specifics of the motor selected. It may prove to be advantageous to manufacture several individual versions with limited adjustability ranges for specific applications/end users.
5) The base and tube may be inverted and attached to a ceiling using hardware such as toggle bolts or lag bolts or other adequate means to secure from a ceiling in situations where it is preferred.
6) The base and support tube may be mounted horizontally or other angle to a wall or work bench using toggle bolts or lag bolts or other adequate means to secure the system where it is preferred.
7) The base may be made of many materials and many shapes based upon the foot print available to fit within a given stand on the market or a specific look desired in a bike shop environment.
8) The shape and dimensions of the tubular support post may be non round, such as oval, square, rectangle if deemed desirable and motor carriage may take that same shape or use a sleeve or insert.
9) The tube may be telescopic in nature using slightly descending or ascending in diameter tubing with locking hardware such as clamps if desired.
10) The tube, if telescopic or similar in nature may be spring loaded to assist in raising the height.
11) The tube may be keyed with a Woodruff key or similar orientation locking device to further secure into base and or motor carriage.
12) The tube may be welded, pressed or attached to the base in many ways known to the art.
13) The tube may be secured in concrete or other adequate means eliminating the base in semi permanent installations.
14) The tube and motor carriage may interact for easier height adjustment using a rack and pinion, pulleys, belts, linear actuators or any other mode of transmission.
15) The motor may be enclosed within a housing such as a box shape or other item made of plastic or metal or other desired material to reduce sound, vibration or simply to provide a professional look.
16) The motor communications cable can be split to use removable connections at the motor and or enclosure using terminals such as 3.5 mm stereo jacks, MOLEX or other similar connection methods known in the art.
17) The interface rod pairs interfacing with the crank arm can be telescopic or include sleeves to increase the distance between the motor plate and the bicycle crank arm.
18) The rubber rod pairs and related alternate embodiments can be made of alternate materials or covered with a softer material such as felt, fleece, cotton or other materials.
19) The interface rod pairs can be a shape other then what are described in the current embodiment and the alternate embodiments if desired.
20) The motor controller board covered in alternate embodiments can be replaced with a custom board with built in absolute max/min or slower forward start torque.
21) The directional control switch can be a wide number of known devices in the art.
22) The directional reverse indicator light can be used to light upon forward instead, or an additional indicator can be added.
23) The speed pedal described in the currently described embodiment can be replaced with one that proves to be of better quality and or more affordable.
24) The directional control switch can be replaced with a secondary pedal—having one pedal for forward and a second for reverse.
25) The entire invention can be used to power a display bicycle to make it appear to be pedaling for trade shows or similar events rather then for maintenance purposes.
26) The power enclosure may be physically attached or incorporate the speed pedal and or a base—or all three may remain separate.
27) The tube may be split into several pieces of equal or unequal lengths which screw together or clamp together to support easier manufacturing and or shipping considerations.
28) A battery powered or car accessory option known to the art may prove to be a marketing based accessory to the power enclosure.
29) A commercially available pre-built AC-DC converter can replace the transformer currently described in the currently described embodiment.
30) The preformed clip of alternate embodiment 4c may be of a different geometry to increase the distance between ends to support thicker crank arms.
31) The ends of the preformed clip can be rounded or other shapes.
32) The ends of the preformed clip can be covered with a felt like or other marring free material to support manufacturing of the entire clip of an alternate material such as plastic or metal.
33) The dimensions of the motor carriage can be modified to connect directly to larger or smaller diameter bike stands similar to alternate embodiment 2b, or a sleeve of plastic or other material can be used to take up extra space.
34) The rod fork of embodiment 4d can be made of different materials such as aluminum or other materials.
35) A knob, knurl or other material can be added to the end of rod fork from embodiment 4d to enhance insertion and removal.
36) Female/male order of several parts can be reversed. For instance, the rod fork may have hollow ends which slide over male tubes protruding from the crank interface arm from alternate embodiment 4d.
37) The springed rod fork from embodiment 4e may be made of metal and covered with a non-marring surface.

38) The springed rod fork from embodiment 4e may be made of multiple pieces connected on one end with a hinged linkage and a compression spring.

39) A pedal shaft accessory having only a shaft may be included to screw into a crank arm without having to use an actual pedal.

40) The crank interface arm may include tracks in place of the holes in which the rod fork from embodiment 4d simply slides in and out of. The shapes of these tracks and corresponding rod fork may be other then that of round, such as square.

Thus the scope of the invention should be determined by the appended claims and their legal equivalents, and not by the examples given.

I claim:

1. A pedaler device for turning a crank assembly of a bicycle while the bicycle is secured in a stand with at least a rear wheel of the bicycle being elevated off the ground, the device comprising:
a stand, the stand having a proximal base end configured for contact with a ground surface and a distal end spaced generally vertically from the base end;
a motor, the motor coupled to the stand and including an output shaft;
a crank interface arm, the crank interface arm including a proximal end coupled to the output shaft and a distal end, a longitudinal axis of the crank interface arm extending orthogonally relative to an axis of the output shaft ; and
a connector mechanism configured for selectively coupling the crank interface arm to one of a crank arm and a pedal of the bicycle.

2. The device of claim 1, wherein the relative vertical position of the motor relative to the base end is adjustable.

3. The device of claim 1, wherein the base end comprises a steel plate.

4. The device of claim 2, wherein the stand comprises a vertically oriented tube with the motor being movable along a length of the tube.

5. The device of claim 1, further including a foot pedal configured to control the speed of the motor.

6. The device of claim 1 wherein the connector mechanism comprises first and second connector rods coupled at proximal ends to opposing ends of a connector shaft, the connector shaft being received in a bore through the crank interface arm proximate the distal end of the crank interface arm, the bore extending in a direction orthogonal to both the axis of the connector shaft and the longitudinal axis of the crank arm interface, the connector shaft being rotatable in the bore between a first position configured to engage the crank arm and a second position wherein the first and second rods are oriented generally parallel to the crank interface arm.

7. The device of claim 6, wherein the connector mechanism further includes a detent mechanism to hold the rods in either or both the first and second positions.

8. The device of claim 1, wherein the connector mechanism comprises one or more bores extending longitudinally into the distal end of the crank interface arm, and a generally u-shaped member having top and bottom spaced apart legs, the legs being configured to be received over an axle of a bicycle pedal and removably received in the one or more bores.

9. The device of claim 1, wherein the connector mechanism comprises a channel extending laterally into the crank interface arm and a generally c-clip having top and bottom spaced apart legs terminating at a base end, the base end being configured to slide into the slot with the legs extending perpendicularly to the longitudinal axis of the crank interface arm and configured for receipt over the crank arm.

10. A combination comprising:
a bicycle, the bicycle including front and rear wheels, a frame and a drive train, the drivetrain including a crankset assembly having left and right crank arms, each respective crank arm having a pedal attached to a distal end thereof;
a bicycle repair stand, the bicycle being supported by the bicycle repair stand with at least the rear wheel being suspended off the ground;
a pedaler device for turning the crank assembly, the device comprising (i) an electric motor including an output shaft, (ii) a crank interface arm, the crank interface arm including a proximal end coupled to the output shaft and a distal end, a longitudinal axis of the crank interface arm extending orthogonally relative to an axis of the output shaft and being located parallel and adjacent to one of the left and right crank arms, and (iii) a connector mechanism removably coupling the crank interface arm to one of the left and right crank arms.

11. The combination of claim 10, wherein the device for turning the crank assembly further includes a stand, the stand having a proximal base end configured for contact with a ground surface and a distal end spaced generally vertically from the base end, the motor being coupled to the stand.

12. The combination of claim 11, wherein the relative vertical position of the motor relative to the base end is adjustable.

13. The combination of claim 11, wherein the stand comprises a vertically oriented tube with the motor being movable along a length of the tube.

14. The combination of claim 11, wherein the device for turning the crank assembly further includes a foot pedal configured to control the speed of the motor.

15. The combination of claim 10, wherein the electric motor of the device for turning the crank assembly is coupled to the bicycle repair stand.

16. The combination of claim 10, wherein the connector mechanism comprises first and second connector rods coupled at proximal ends to opposing ends of a connector shaft, the connector shaft being received in a bore through the crank arm interface proximate the distal end of the crank interface arm, the bore extending in a direction orthogonal to both the axis of the connector shaft and the longitudinal axis of the crank arm interface, the connector shaft being rotatable in the bore between a first position configured to engage the crank arm and a second position wherein the first and second rods are oriented generally parallel to the crank interface arm.

17. A method comprising:
providing a bicycle, the bicycle including front and rear wheels, a frame and a drive train, the drive train including a crank assembly having left and right crank arms, each respective crank arm having a pedal attached to a distal end thereof;
providing a bicycle repair stand;
placing the bicycle in a bicycle repair stand wherein at least a rear wheel of the bicycle is elevated off of the ground;
providing a pedaler device for turning the crank assembly, the device comprising (i) an electric motor including an output shaft, (ii) a crank interface arm, the crank interface arm including a proximal end coupled to the output shaft and a distal end, a longitudinal axis of the crank interface arm extending orthogonally relative to an axis of the output shaft, and (iii) a connector mechanism configured to removably couple the crank interface arm to one of the left and right crank arms;

aligning the crank interface arm with one of the left and right crank arms wherein the crank interface arm and the respective left or right crank arm are located adjacent and substantially parallel to each other;

coupling the right or left crank arm with the crank interface arm using the connector mechanism;

turning the drive train in a first direction through the coupled crank interface arm as coupled to the respective left or right crank arm by activating the motor; and adjusting drive train parameters as the drive train is turning.

18. The method of claim 17, further comprising, reversing the direction of the motor and turning the drive train in a second direction.

19. The method of claim 17, wherein the connector mechanism comprises first and second rods coupled at proximal ends to opposing ends of a connector shaft, the connector shaft being received in a bore through the crank interface arm proximate the distal end of the crank interface arm, the bore extending in a direction orthogonal to both the axis of the connector shaft and the longitudinal axis of the crank interface arm, the connector shaft being rotatable in the bore between a first position configured to engage the crank arm and a second position wherein the first and second rods are oriented generally parallel to the crank interface arm; and wherein said coupling the right or left crank arm with the crank interface arm further includes moving the rods from a second position to a first position.

20. The method of claim 17, wherein the drive train includes a derailleur and said adjusting the drive drain includes adjusting the derailleur.

* * * * *